(No Model.)

A. W. VAN DORSTON.
CAR COUPLING.

No. 517,178.

Patented Mar. 27, 1894.

(No Model.)

A. W. VAN DORSTON.
CAR COUPLING.

No. 517,178. Patented Mar. 27, 1894.

Witnesses
F. L. Ourand
W. E. Schneider

Inventor
Alvin W. Van Dorston (No Model.) 9 Sheets—Sheet 4.

A. W. VAN DORSTON.
CAR COUPLING.

No. 517,178. Patented Mar. 27, 1894.

WITNESSES:
F. L. Ouraud
W. E. Schneider.

INVENTOR,
Alvin W. Van Dorston.

THE NATIONAL LITHOGRAPHING COMPANY,
WASHINGTON, D. C.

(No Model.) 9 Sheets—Sheet 5.
A. W. VAN DORSTON.
CAR COUPLING.

No. 517,178. Patented Mar. 27, 1894.

WITNESSES: INVENTOR,
F. L. Ouraud Alvin W. Van Dorston,
W. E. Schneider.

THE NATIONAL LITHOGRAPHING COMPANY,
WASHINGTON, D. C.

(No Model.) 9 Sheets—Sheet 8.

A. W. VAN DORSTON.
CAR COUPLING.

No. 517,178. Patented Mar. 27, 1894.

WITNESSES:
F. L. Ourand
W. E. Schneider

INVENTOR,
Alvin W. Van Dorston (No Model.) 9 Sheets—Sheet 9.

A. W. VAN DORSTON.
CAR COUPLING.

No. 517,178. Patented Mar. 27, 1894.

Fig. 31.

WITNESSES:
F. L. Durand.
W. E. Schneider.

INVENTOR,
Alvin W. Van Dorston,

UNITED STATES PATENT OFFICE.

ALVIN W. VAN DORSTON, OF WASHINGTON, DISTRICT OF COLUMBIA.

CAR-COUPLING.

SPECIFICATION forming part of Letters Patent No. 517,178, dated March 27, 1894.

Application filed July 11, 1891. Serial No. 399,176. (No model.)

*To all whom it may concern:*

Be it known that I, ALVIN W. VAN DORSTON, a citizen of the United States, residing at Washington, in the District of Columbia, have invented certain new and useful Improvements in Cushioned Automatic Car-Couplings of the Twin-Jaw Type; and I do hereby declare the following to be a full, clear, and exact description of the invention, such as will enable others skilled in the art to which it appertains to make and use the same.

My present invention relates to improvements in cushioned automatic car couplings of the class known as the master car builders' type, and more particularly to improvements upon Letters Patent No. 328,547, granted to me under date of October 20, 1885; No. 341,292, granted to me under date of May 4, 1886; No. 405,384, granted to my assignee under date of June 18, 1889, and No. 310,720, granted to William V. Perry under date of January 13, 1885.

The objects of the invention are, first, to improve the construction of the bar proper; secondly, to adapt the bar for the use of different constructions of interlocking bars and tumblers, adapted to be operated by the same uncoupling mechanism; thirdly, to provide the bar head with a pocket in its jaw side, designed to receive a cushion of special construction to afford a combined mechanical and pneumatic cushion action; fourthly, to provide the bar lugs with flanged tapered bushings preferably serving as pivot bearings for the knuckle, and finally to improve the various details of construction of the coupler to insure certainty and efficiency of operation.

With these several ends in view, the invention consists in the features of construction and combinations of devices hereinafter fully set forth and pointed out in the appended claims.

Referring to the accompanying drawings forming a part of this specification: Fig. 12 is a vertical longitudinal section showing the guard arm side of the bar, also showing the draw bolt secured within the bar end by means of a clevis and transverse key used in connection with continuous or common draw-gear appliances; Fig. 17, a bottom plan of the bar head with the uncoupling mechanism and jaw removed. Fig. 18 shows vertical longitudinal sections of the knuckle taken through the lines y—y of Fig. 19, which latter shows top plan views. Fig. 20 shows the buffer and securing rivet to the guard arm. Fig. 29 is a cross section of the front sill taken through the center of car showing the inner side elevation of the hanger as applied to the sill serving as a carrier and having a globe bearing, and an uncoupling shaft with lever and rod attached thereto.

A indicates the draw head proper having a pivoted knuckle, B, and a guard arm provided with a cushioned buffer, C. The head is also provided with a horn on its upper side formed with a series of small ribs, 4, adapted to prevent cracks in casting when cooling in the mold, or in annealing after casting. The stem, 5, is provided at its rear end with openings, 6 and 7, adapted for the use of a clevis, 8, for securing the eye bolt, 9, said clevis being secured in the bar by means of a key, 10, and the bolt with its pin, 11. The openings, 6 and 7, also permit the use of the standard draw bar pocket or yoke secured to the bar. The bar stem is further provided with two transverse openings, 12 and 13, and grooves, 14, in the outer sides of the bar wall, permitting the use of spring cotters to secure the cross pin, 15, (the same may be riveted at both ends if preferred) which serves as the carrier pin for the rear end of the locking tumblers, 1, 2 and 3, shown in Figs. 2, 3, 4 and 7, or the modified form of tumblers, 16 and 17, shown in Fig. 8. Each of the tumblers is formed with a curved slot, 18, through which the supporting pin, 15, passes, and the weight of said tumblers causes them to engage and lock the knuckle in its closed position, the curve, 18, serving to diminish friction upon the inclined plate, 19, as the tumblers slide thereon.

When the tumblers, 1, 2 and 3, are employed, the cross pin, 15, has bearing in the opening, 13, of the bar, but when the modified form of tumbler is used said cross pin bears in the opening, 12, and the inclined plate, 19, is omitted. Thus it will be apparent that either form of tumbler may be used with the construction of bar shown.

Figures 7, 21, 22, 23, 24, 25, 26, 27, 28:
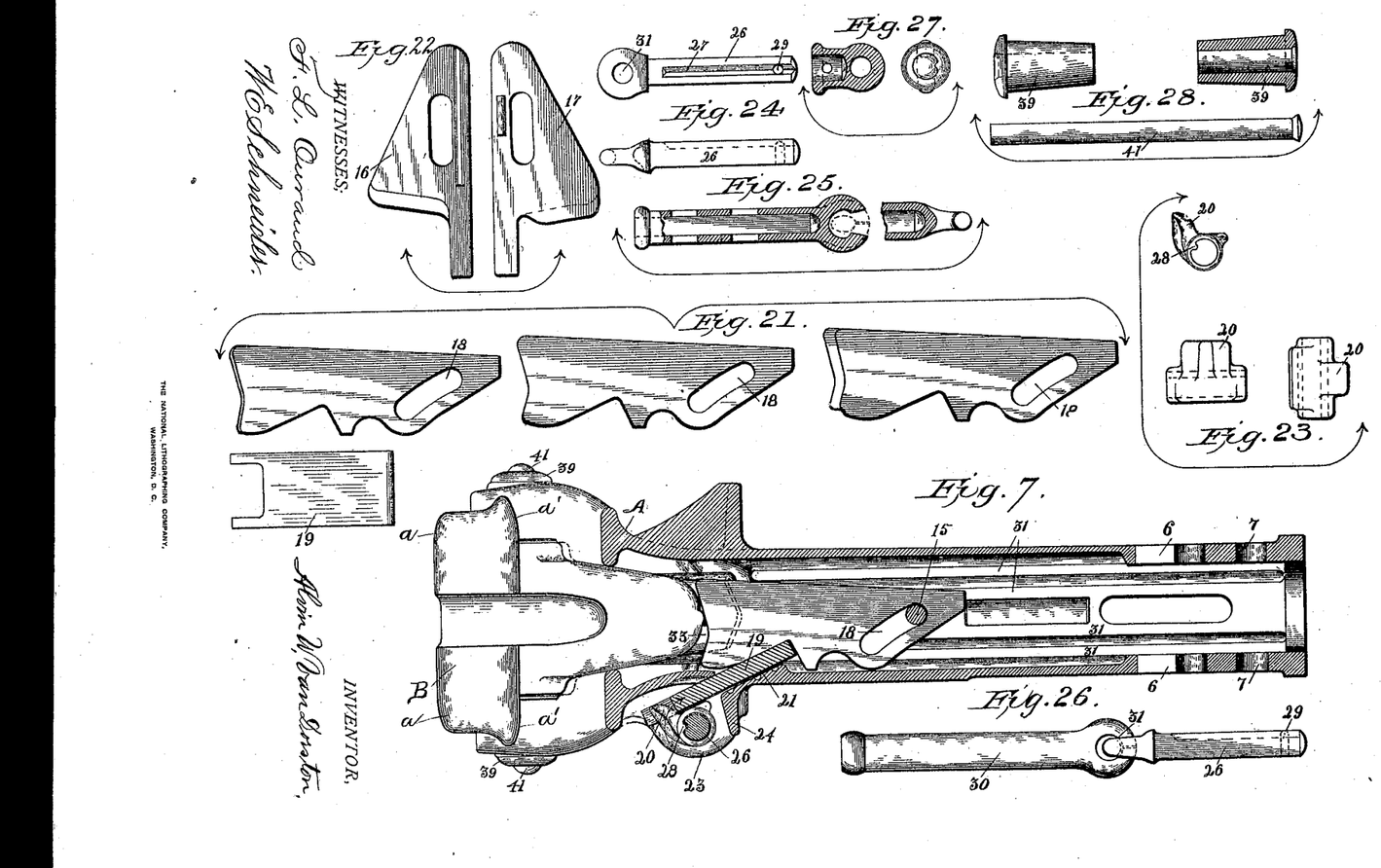
Fig. 7 is a vertical longitudinal section of the bar showing the interior and locking mechanism, and showing also the inner and outer face of the jaw nose rounded or beveled in form at its upper and lower ends.
Fig. 21 shows side elevations of the locks Nos. 1, 2 and 3 removed from the bar.
Fig. 22 shows similar views of the locks modified.
Fig. 23 shows top, bottom and side elevations of my improved uncoupling cam.
Fig. 24, detached views of the rock pin to said cam.
Fig. 25, the rock pin sleeve.
Fig. 26, the sleeve of increased length and rock pin united.
Fig. 28 shows views of the flanged pivot bushings and rivet of the bar lugs and knuckle.
Figures 8, 9, 11:
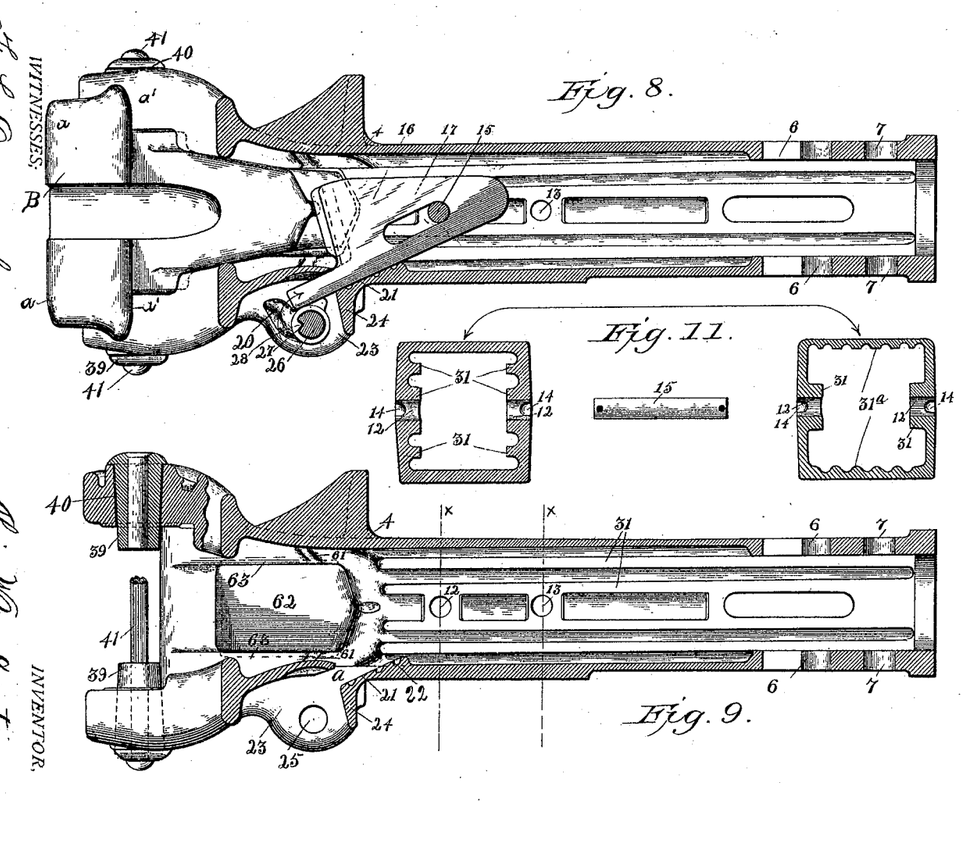
Fig. 8, a similar view to Fig. 7, showing same modified.
Fig. 9, a longitudinal section of the bar with the knuckle and lock mechanism removed.
Fig. 11, two cross sections taken through the lines x—x of Figs. 7, 8 and 9.
Figure 10:
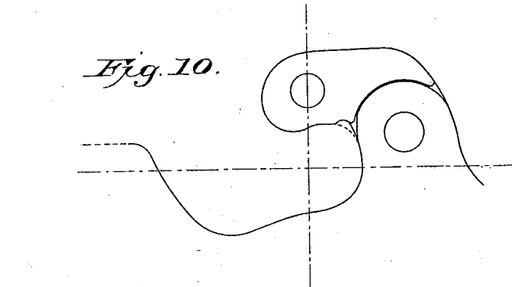
Fig. 10, an improved contour to which the couplers may conform in their construction.

The employment of the inclined sliding plate, 19, insures the even and simultaneous movement of the tumblers, 1, 2 and 3, to release the knuckle, B, when said tumblers are withdrawn by the action of a cam, 20, against said plate in the direction of the arrows shown in Figs. 7 and 8.

The stationary incline, 21, upon which the plate, 19, slides may be formed with transverse grooves, 22, to receive a lubricating compound for lubricating the plate, 19.

It will be observed that by the location of the cam, 20, on the under side of the bar, said cam is protected by the side walls, 23, and the rear cross wall, 24, which form an inclosure for the protection of the operating parts therein, all of which are centrally located on the bottom side of the bar head. The cam therein is mounted upon a rock pin, 26, provided with a groove, 27, to receive the rib, 28, formed within the cam opening. In securing the rock pin and cam in their proper positions with relation to the bar, a spring cotter is inserted into the opening, 29. The eye head shown in Fig. 27 is secured in the same manner, and a sleeve, 30, is secured at the opposite end of the rock pin by having its points closed together from the position shown in Fig. 25 to that shown within the eye, 31, of Fig. 26 to receive a rock-shaft which will be described hereinafter.

Figure 1:
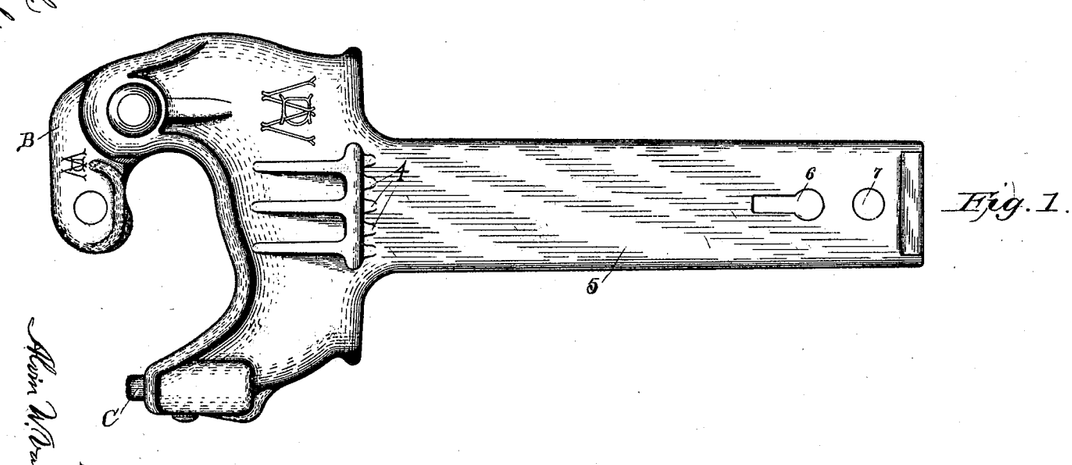
Figure 1 is a top plan view of my improved coupler with the knuckle in a closed position.
Figures 2, 3, 4:
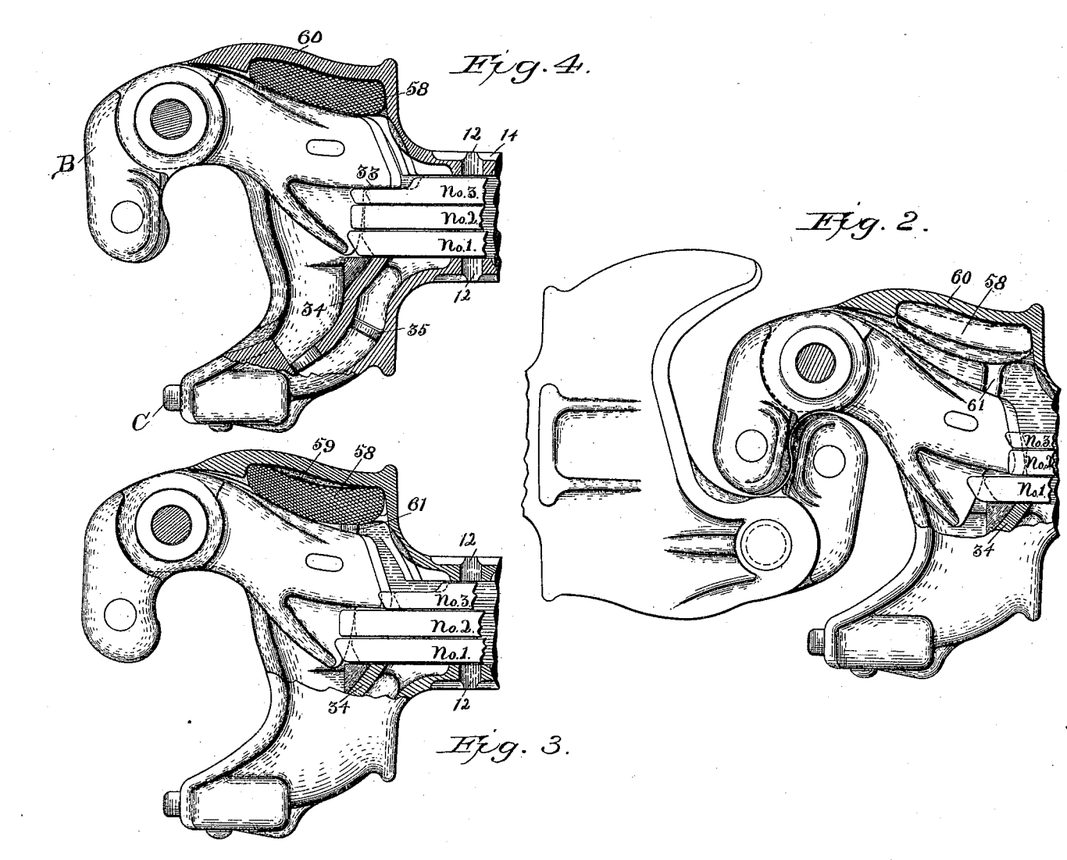
Fig. 2, a view of two of the heads coupled together with the knuckle arms interlocked in the first position with the interlocking bars.
Fig. 3, a view showing the knuckle arm interlocked in the second position.
Fig. 4, a similar view with the knuckle arm interlocked in the third position, or when coupled in full.

Referring to Figs. 7 to 14, the top and side walls of the bar are formed with ribs, 31 and 31ª, to increase the strength of the bar stem, and also to afford an extended locking surface, 32, opposite the knuckle bearing, 33, as shown in Fig. 4. The bearing, 32, is reinforced by means of the inner wall, 34. The web, 35, in the guard arm, serving as a brace to the inner wall, is supported by the outer wall of the guard arm, the inner wall serving also to prevent damage by links entering and breaking out the rear wall of said guard arm, which frequently occurs in couplers unprovided with this feature.

Figures 12, 17, 18, 19, 20:
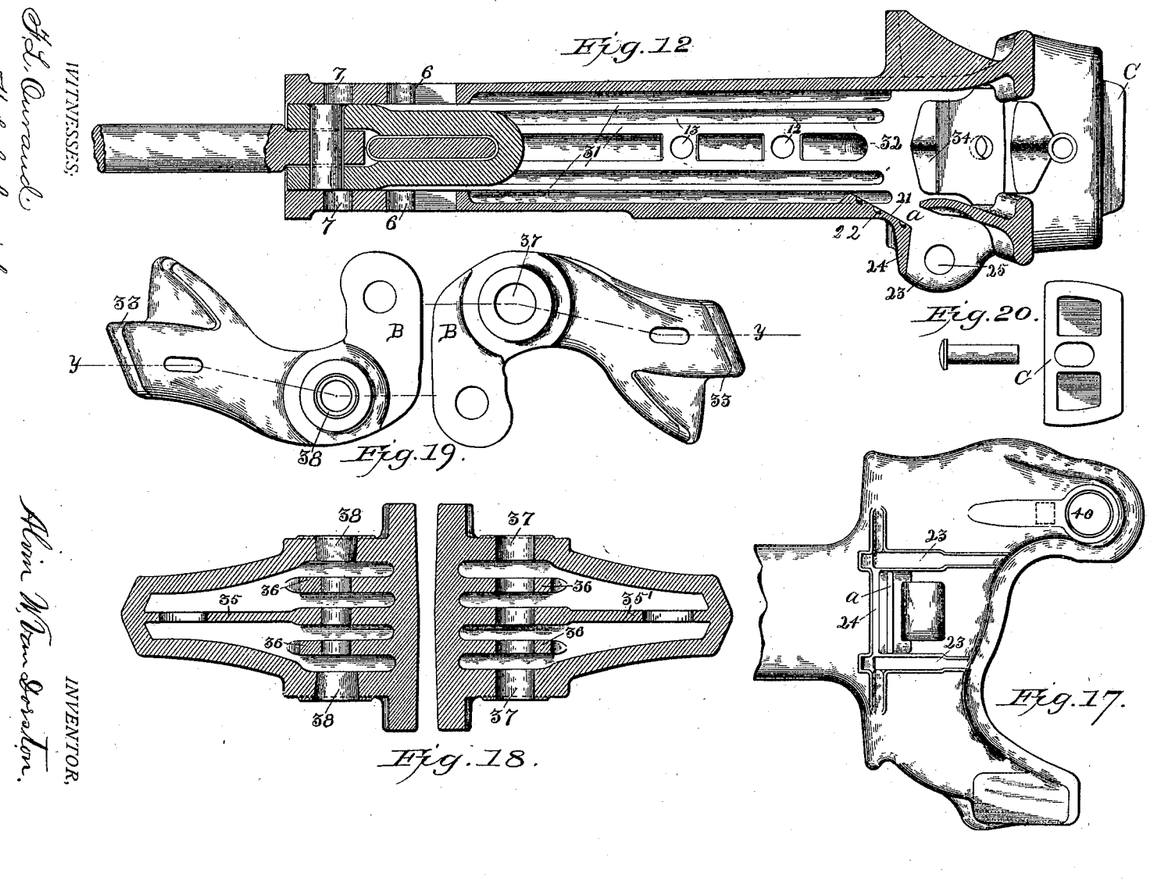

To contribute strength and durability to the knuckle arms, I cast them hollow, as shown in Fig. 18, and provide them with internal ribs, 35′ and 36. I have illustrated also in Fig. 18 the forms of openings to receive the pivot for securing the knuckle to the draw head. At the right hand side of Fig. 18 an opening, 37, is shown adapted to receive a pin of the form shown in Figs. 5 and 6, while at the left hand side of the figure a tapered opening, 38, is shown, the central portion of which is smaller or reduced to receive a securing bolt or rivet, 41, as shown in Figs. 8 and 9, the tapered ends of the opening being adapted to receive bushings, 39, which are inserted through the openings, 40, of the bar lugs, and thence extending into the tapered openings, 38, thus forming a pivotal connection between the knuckle and bar. It will be apparent that by this construction the knuckles cannot come in contact with the securing pin, 41, and hence damage and distortion of the parts in use is avoided. If desired, the bushings, 39, may be secured by means of keys or equivalent devices.

I have shown in the drawings two different arrangements of mechanism for automatically opening the knuckle after the latter has been released by the locks preparatory to effecting a connection with a coupler of a similar type. In the form shown in Fig. 16 I provide a chamber, 42, see Fig. 14, in the rear portion of the bottom bar lug, within which chamber is located a spring, 43 (consisting preferably of a block of rubber) upon which is set a metallic piece, 44, provided at its upper end with an anti-friction wheel, 45, having its journals tapered in form and secured by means of lips, 46, which are closed over said journals in such manner as to permit a free rotation of the wheel and its bearings. In this construction, the knuckle is slightly inclined on the lower hub face against which the wheel operates, the weight of the knuckle being carried by said wheel and the cushioned bottom supporting the same. It will also be observed that the outer and inner faces of the jaw, B, are beveled or suitably sloped in form at $a$ and $a'$ near the two ends adapting them to move vertically with each other, without becoming cramped, when passing over sharp vertical curves or hollows such as are found in coal yards, or in elevated tracks entering city limits.

Figure 5:
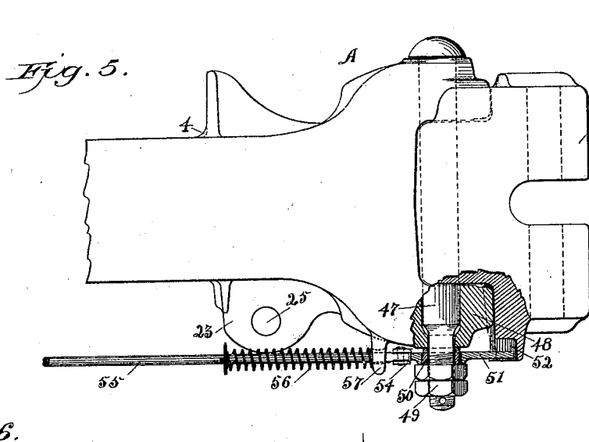
Fig. 5, a jaw side elevation of the bar with the knuckle in an open position showing the lower portion and bar lug of same in section, and the self-opening mechanism.
Figure 6:
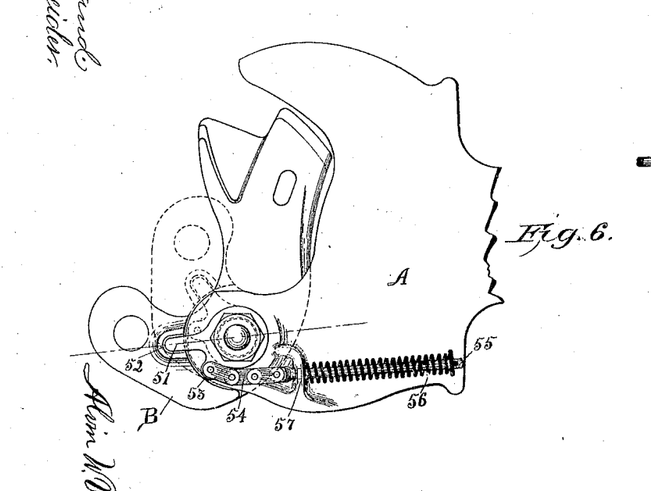
Fig. 6 a bottom plan of the draw head with the knuckle thrown open, showing also a general plan of the self-opening mechanism.

In Figs. 5 and 6 I illustrate another combination of devices for effecting the automatic opening of the knuckles. In this instance the pivot pin, 47, upon which the knuckle rotates is reduced in size at its lower end, and the lower bar lug, 48, is provided with a corresponding opening. Between the under side of the lug, 48, and the nuts, 49, I interpose a metallic collar, 50, against which said nuts are set. This collar serves the double purpose of preventing the bar lugs or pin from being sprung from the blows of opposing bars in use, and of acting as a bearing for a loosely fitted flanged washer having an arm, 51, the end of which extends into a U-shaped cavity, 52, formed in the under side of the jaw. Adjacent to the arm, 51, is provided a secondary arm, 53, to which is secured a chain, 54, of suitable construction, operating about the outer surface of the washer. This chain is secured to a rod, 55, provided with a spiral spring, 56, said rod extending through an opening of the wall, 57, on the bottom of the draw head, as clearly shown in Figs. 5 and 6.

An important feature of the present invention is the construction and operation of the cushion, 58, shown in Figs. 2, 3 and 4. This cushion consists of a concavo-convex or a dished block of rubber. Fig. 2 shows a plan view of the cushion, while Fig. 3 is a horizontal section illustrating the cushion as partially compressed with its concave surface, 59, approaching the wall, 60, of the bar head when the knuckle is engaged by the lock No. 2. In Fig. 4 the cushion, 58, is shown in full contact with the wall, 60, and the knuckle, B, engaged by the lock No. 3. By this construction and arrangement of the cushion it will be obvious that a very limited pressure only of the knuckle arm is required to absorb the spring action of the partially elliptical cushion, thus rendering the latter capable of performing a part of the automatic action in throwing the knuckle open, in addition to its primary function of absorbing the blows and impact of opposing couplers. These cushions are formed with projecting portions or a boss above and below their main body portions to aid in securing them in place in the draw head.

Figures 13, 14, 15, 16:
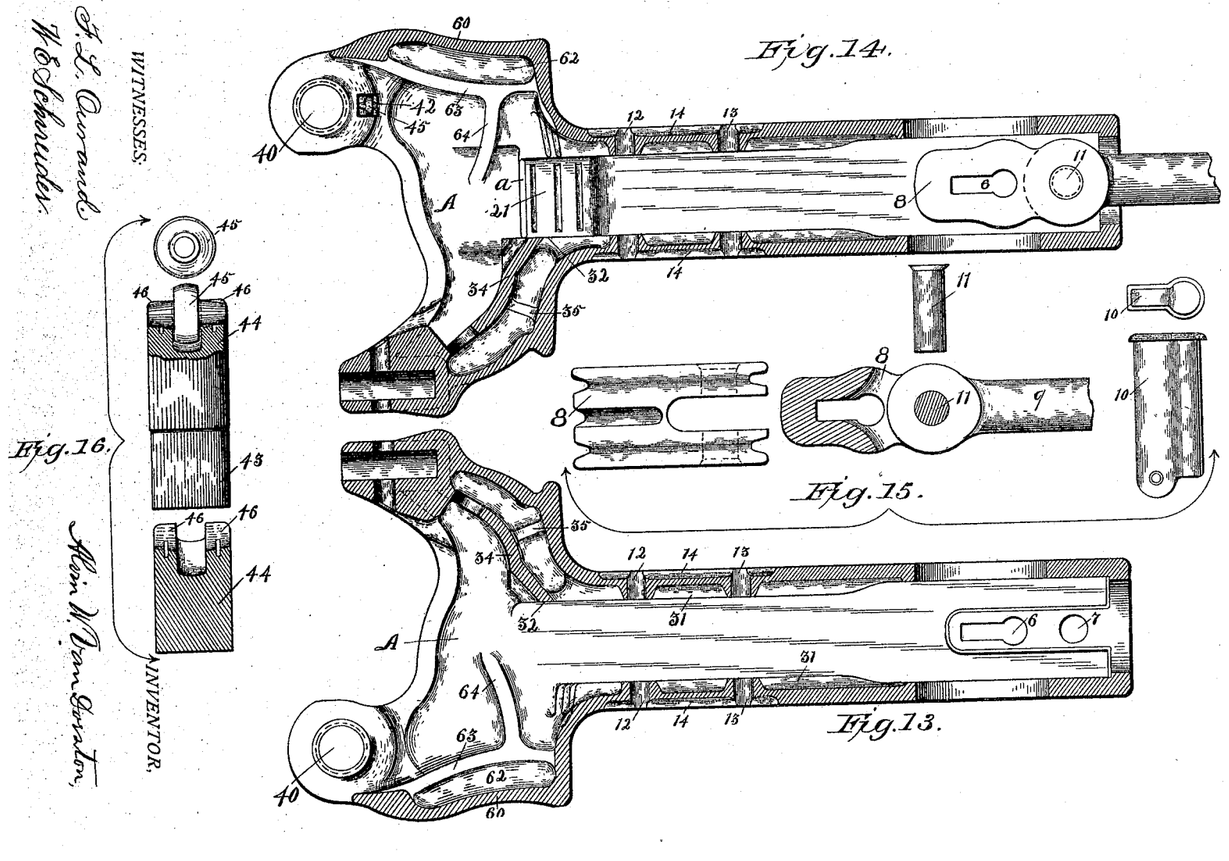
Fig. 13, a transverse longitudinal section of the bar showing the interior of the top half.
Fig. 14, a similar view to Fig. 13, showing the interior of the bottom side of the bar with the draw bolt clevis located in the rear end, and the adjustable anti-friction device in the lug of bar at the front end.
Fig. 15 represents the several detailed views of the draw bolt head and keys for securing the same within the bar.
Fig. 16, a side elevation of the anti-friction opening device to the knuckle.

In Figs. 13 and 14 the pockets, 62, are formed with front ribs, 63, and an inclined rib, 64, having a flat upper surface and acting as a guide to the knuckle arm, so that in its wear or lost motion upon the vertical axis said arm will always be brought in contact with the cushion.

It will be observed that there is an air space between the concave face of the cushion and the wall of the bar, and thus I obtain in use a combined mechanical and pneumatic cushioning action to withstand and absorb the impact of opposing couplers, and thus effectually protect the knuckle and bar from undue jar and breakage.

Figures 29, 30:
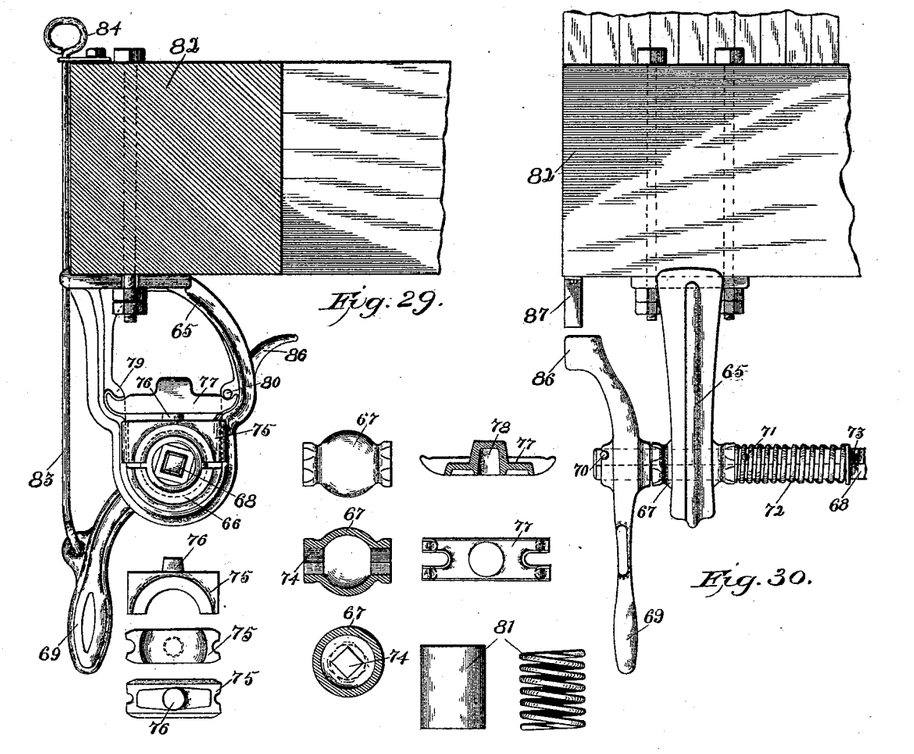
Fig. 29, an eye head which may be secured to the opposite end of said rock pin, by means of a spring cotter.
Fig. 30, a front elevation of said hanger, lever and uncoupling shaft, including various views of the detail parts to same.
Figure 31:
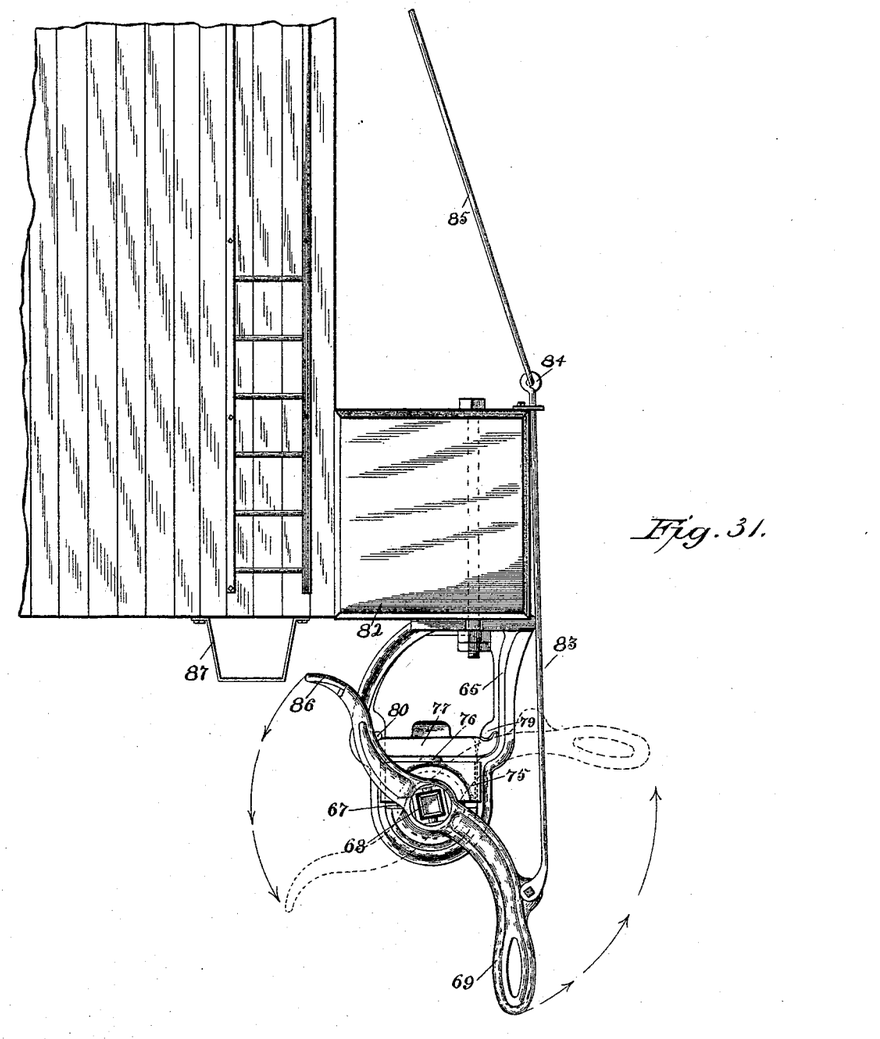
Fig. 31 is an outer side elevation of the hanger with rods for operating the uncoupling mechanism either from the ground, the side or top of car.

Referring to the uncoupling mechanism, the hanger, 65, is made in form of a loop having cast in its bottom a suitable bearing, 66, in which the globe journal, 67, operates, serving as an adjustable carrier to the uncoupling shaft, 68. In my present construction the opening through the globe bearing, 66, is made to receive a plain square shaft, 68, without being forged in any way; therefore, the hand lever, 69, having an opening through its center, is secured upon the outer projecting end of said shaft having a flanged head, not shown, or by means of a cotter inserted through the opening, 70, as shown. The inner opening, 71, is used only in the absence of the spring, 72. When employing the spring, 72, a cotter is inserted through the opening, 73, whereby the rock-shaft is allowed to move laterally through the opening, 74, of the globe bearing to accommodate the movements of said shaft caused by the lateral motion of the coupler head. The globe formed carrier, 67, is provided with a loosely fitted cap, 75, having a boss, 76, said cap being secured over the globe bearing with a cross piece, 77, which is provided with a chamber, 78, having a metallic or rubber spring, 81, either of which may be interposed between the bottom of the chamber, 78, and the boss, 76, serving to hold the cap, 75, in contact with the bearing, 67, in a yielding manner for the purpose of holding the shaft, 68, and bearing, 67, in any position required by means of friction, thus obviating the longitudinal movement and expensive devices (to set the rock-shaft when it is desired to prevent the couplers from making connection when coming together where one or both knuckles are in an open position) required in many of the couplers now in use. If it is desired to have the couplers automatic at all times when the knuckles are in an open position, it is only necessary to omit the use of the spring, 81, which will allow the lever, 69, to return from the uncoupled position shown in dotted lines to the original position, as shown in Fig. 31, when released from the hand. The lips, 79, and cotter, 80, serve to retain the parts in place, and to permit the same to be easily put together without the use of bolts or extra expense. The connection of the rock-shaft, 68, with the coupler is effected by means of the sleeve, 30, shown in Fig. 26, which is provided with a chamber corresponding with the form of the shaft inserted therein, which is preferably square in form. The application of the uncoupling mechanism to the cars is effected by securing the hanger frame, 65, to the bottom side of the end car sill, 82, by means of two bolts, as shown in Figs. 29, 30 and 31. A rod, 83, may be attached to the lever, 69, extending to the top of said sill and provided at its upper end with a loop, 84. I may also provide a second rod, 85, connected to the loop, 84, and extending to the top of the car and suitably arranged at its upper end so that it may be operated either from the top of the car, or from the top of the car sill to disconnect the couplers. The lever, 69, is also provided with an upper end having a side lip, 86, which may be operated by the foot of the trainman from the side of the car when holding to the side ladder and having one foot in the stirrup, 87, as shown in Fig. 31. Thus it will be seen that the uncoupling mechanism is simple, and adapted to be easily operated from any of the places described, and from the ground without endangering the lives or limbs of trainmen.

Having thus fully described the several functions and combinations of parts as new and useful, what I desire to secure by Letters Patent of the United States is—

1. In an automatic cushioned car coupler, the combination with a draw bar provided with a pocket, of a pivoted jaw and arm, a series of locks for engaging the latter, a releasing device located below the bar for simultaneously raising all of said locks, and a concavo-convex cushion supported in said pocket to effect a combined mechanical and pneumatic cushioning action, substantially as and for the purpose specified.

2. The combination with a car coupler of the interlocking jaw type, of a draw bar formed with a cavity, recess or pocket, and a concavo-convex yielding block or cushion arranged in said pocket and adapted in co-operation with the pivoted jaw to afford a combined mechanical and pneumatic cushion to absorb the impact when two opposing couplers contact, substantially as and for the purpose specified.

3. The combination with a draw bar having a pocket or cavity, of a yielding block or cushion seated in said pocket or cavity with an air space between the cushion and outer wall of the pocket, said space being adapted to be filled by the movement of the cushion in coupling, substantially as and for the purpose specified.

4. In an automatic car coupling of the cushioned and twin jaw type, the draw bar head having a pocket provided with a concavo-convex cushion interposed between the wall of the draw head and knuckle arm, substantially as shown and for the purpose described.

5. In an automatic car coupling of the twin jaw type having a bar stem provided with two transverse openings, a suitable cross pin, an incline suitably adapted to the use of an incline plate, and a series of locks serving to interlock with the knuckle arm, substantially as and for the purpose set forth and described.

6. In an automatic car coupler of the cushioned and twin jaw type, the series of interlocking tumblers with curvilinear reciprocating movement, in combination with a movable interposed incline plate with means for simultaneously releasing said tumblers from an interlocked position with the knuckle arm, substantially as and for the purpose set forth and described.

7. In an automatic car coupling of the cushioned twin jaw type, a draw-head of the kind shown having cast upon its bottom side two circularly formed walls joined by a rear cross wall centrally located thereon, and a rock pin of the kind described arranged in the openings of said walls, in combination with a lifting cam, the movable and immovable inclines and interlocking tumblers, substantially as set forth and described.

8. In an automatic car coupling of the cushioned and twin jaw type, the combination with the draw head, of a pivoted knuckle, a series of locking tumblers, of a movable incline plate, a lifting cam, rock pin and sleeve, a rock-shaft with hanger and lever for simultaneously operating said tumblers to disconnect the couplers, substantially as and for the purpose set forth and described.

9. In an automatic car coupling of the cushioned kind, having a series of interlocking tumblers with curvilinear slots, and forward inclined ends operating upon a cross pin, and a movable incline plate, a cam and rock pin, substantially as and for the purpose set forth and described.

10. In an automatic cushioned car coupling having a series of interlocking tumblers provided with curvilinear slots operating upon a cross pin at their rear ends, and a movable incline plate at their forward ends interposed between a fixed self lubricating incline of the bar, and the corresponding inclines of said locks, substantially as and for the purpose set forth.

11. In an automatic cushioned car coupling of the twin jaw class, the draw bar stem having inner ribs, a lock bearing surface provided by the inner wall of the guard arm, substantially as and for the purpose set forth and described.

12. In a car coupling of the cushioned master car builders' type, such as herein described, a draw-head and pivoted knuckle, with a series of interlocking tumblers, in combination with a movable and immovable incline, a rock pin provided with a cam and sleeve having a movable rock-shaft with one end operating within said sleeve and the other extending through a spring and hanger bearing provided with a hand lever, substantially as and for the purpose set forth.

13. In a car coupling having a hanger in one part, a globe bearing, a cap and cross-bar secured in the lower portion of said hanger, substantially as shown, a rock-shaft secured in the opening of said globe bearing, a lever secured to the outer projecting end of said shaft, and rods secured to said lever, the car sill and top of car, serving for the purpose of disconnecting the couplers, substantially as set forth.

14. The hanger loop for the unlocking rod of a car coupling, having the lower bearing for said rod integral with it, the said hanger, and a yielding upper bearing, substantially as described.

15. In a car coupling, the horn of the draw head having a series of small ribs, 4, at its rear base to prevent shrink cracks in the casting of the bars or in annealing said heads, substantially as and for the purpose specified.

16. In a car coupling of the twin jaw type, a bar stem provided with transverse openings and combined with grooves in the outer surface of the side walls of said stem for the reception of lock carrying pins, substantially as set forth and described.

17. In an automatic car coupling of the twin jaw class, a draw head having its lower lug opening formed of two diameters, and its bottom portion adapted to receive a pin conforming thereto, upon whose lower end is secured an annular flanged washer with a projecting arm, which extends into the cavity of the pivoted jaw, in combination with a carrier rod and spring, serving to rotate the knuckle to an open position, substantially as shown and described.

18. In an automatic car coupling of the twin jaw type, the combination with the draw head, a pivoted knuckle arm, and the pivot pin having its lower end reduced in size (suitably adapted to the corresponding openings of the bar head lugs), a collar permanently fixed by means of jam-nuts, with a loosely fitted flanged washer interposed between said nuts and the bar lug having arms, 51 and 53, whereby the said washer serves to move the knuckle in an open position by action of the spring and chain connected therewith, substantially as and for the purpose set forth and described.

19. In a car coupling of the kind described, having a jaw with its inner and outer faces, $a$ and $a'$, suitably sloped or beveled to permit freedom in the vertical motion of said jaws when the same are in a coupled position, substantially as set forth and for the purpose described.

In testimony whereof I affix my signature in presence of two witnesses.

ALVIN W. VAN DORSTON.

Witnesses:
W. A. SMITH,
F. L. OURAND.